United States Patent
Hemo et al.

(10) Patent No.: US 11,581,966 B2
(45) Date of Patent: Feb. 14, 2023

(54) CHIP CONFIGURATION FOR AN ANTENNA ARRAY

(71) Applicant: QUALCOMM Incorporated, San Diego, CA (US)

(72) Inventors: Evyatar Hemo, Kiryat Bialik (IL); Evgeny Levitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 16/947,169

(22) Filed: Jul. 21, 2020

(65) Prior Publication Data

US 2022/0029720 A1    Jan. 27, 2022

(51) Int. Cl.
| | |
|---|---|
| *H04B 17/391* | (2015.01) |
| *H04B 17/27* | (2015.01) |
| *G06F 30/39* | (2020.01) |
| *H01Q 21/06* | (2006.01) |
| *H04B 7/0426* | (2017.01) |
| *G06F 113/18* | (2020.01) |

(52) U.S. Cl.
CPC ......... *H04B 17/3912* (2015.01); *G06F 30/39* (2020.01); *H01Q 21/065* (2013.01); *H04B 7/043* (2013.01); *H04B 17/27* (2015.01); *G06F 2113/18* (2020.01)

(58) Field of Classification Search
CPC .... H04B 17/3912; H04B 7/043; H04B 17/27; G06F 30/39; G06F 2113/18; H01Q 21/065; H01Q 21/0006; H01Q 21/0087; H01Q 3/38
USPC .............................................. 455/450, 456.1
See application file for complete search history.

(56) References Cited

U.S. PATENT DOCUMENTS

| | | |
|---|---|---|
| 6,922,116 B1 | 7/2005 | Gordon et al. |
| 2015/0171523 A1 | 6/2015 | Kamgaing et al. |
| 2019/0089434 A1* | 3/2019 | Rainish ................ H04B 7/0617 |

(Continued)

OTHER PUBLICATIONS

Hansen R.C., et al., "Subarray Quantization Lobe Decollimation," IEEE Transactions on Antennas and Propagation, IEEE Service Center, Piscataway, NJ, US. vol. 47. No. 8, Aug. 1, 1999 (Aug. 1, 1999), XP011003606, ISSN: 0018-926X, pp. 1237-1239, the whole document.

(Continued)

*Primary Examiner* — Fitwi Y Hailegiorgis
(74) *Attorney, Agent, or Firm* — Qualcomm Incorporated (57) ABSTRACT

Various aspects of the present disclosure generally relate to wireless communication. In some aspects, a device may receive layout information that identifies a configuration of an antenna array of antennas, wherein the antenna array is to include a plurality of antenna subarrays and a plurality of antenna chips, wherein each antenna chip is communicatively coupled to antennas of an associated antenna subarray; determine, based at least in part on a phase shift characteristic associated with the antennas, a set of phase differences between antenna subarrays; determine, based at least in part on the set of phase differences, a chip position of each antenna chip relative to the associated antenna subarray; and generate, based at least in part on the chip position of each antenna chip, a layout of an antenna package to receive the antenna array and the plurality of antenna chips. Numerous other aspects are provided.

30 Claims, 7 Drawing Sheets

(56) References Cited

U.S. PATENT DOCUMENTS

2020/0169006 A1* 5/2020 Chou .................. H01Q 21/065

OTHER PUBLICATIONS

Hansen R.C., "Suppression of Sub-Array Quantization Lobes," Phased Array Systems and Technology, 2000. Proceedings, 2000 IEEE International Conference on Dana Point, CA, USA, May 21-25, 2000, Piscataway. NJ. USA, IEEE, US, May 21, 2000 (May 21, 2000), pp. 311-314, XP010504598. DOI: 10.1109/PAST.2000. 858963 ISBN: 978-0-7803-6345-8, the whole document.
International Search Report and Written Opinion—PCT/US2021/034495—ISA/EPO—dated Sep. 28, 2021.

* cited by examiner

CHIP CONFIGURATION FOR AN ANTENNA ARRAY

FIELD OF THE DISCLOSURE

Aspects of the present disclosure generally relate to wireless communication and, for example, to chip configuration for an antenna array.

BACKGROUND

A radiation pattern of an antenna may show a pattern of lobes at various angles. In a directional antenna in which the objective is to emit radio waves in a particular direction, the pattern of lobes may include a main lobe at an angle corresponding to the particular direction and one or more side lobes at angles corresponding to directions other than the particular direction. A side lobe level (SLL) may include information indicating a different between a size of the side lobes in the radiation pattern and a maximum level of the main lobe.

SUMMARY

In some aspects, a method comprising: receiving, by a device, layout information that identifies a configuration of an antenna array of antennas, wherein the antenna array is to include a plurality of antenna subarrays and a plurality of antenna chips, wherein each antenna chip of the plurality of antenna chips is communicatively coupled to antennas of an associated antenna subarray of the plurality of antenna subarrays; determining, by the device and based at least in part on a phase shift characteristic associated with the antennas, a set of phase differences between antenna subarrays of the plurality of antenna subarrays; determining, by the device and based at least in part on the set of phase differences, a chip position of each antenna chip relative to the associated antenna subarray of the antenna chip; and generating, by the device and based at least in part on the chip position of each antenna chip, a layout of an antenna package to receive the antenna array and the plurality of antenna chips.

In some aspects, a device includes: a processor; an antenna array comprising a plurality of antenna subarrays; and a plurality of antenna chips, wherein each antenna chip of the plurality of antenna chips is communicatively coupled between the processor and antennas of an associated antenna subarray of the plurality of antenna subarrays, and wherein differences between distances, between each of the plurality of antenna chips and corresponding antennas of the plurality of antenna subarrays, are greater than a threshold difference.

In some aspects, a non-transitory computer-readable medium storing instructions includes: one or more instructions that, when executed by one or more processors, cause the one or more processors to: receive layout information that identifies a configuration of an antenna array of antennas, wherein the antenna array is to include a plurality of antenna subarrays and a plurality of antenna chips, wherein each antenna chip of the plurality of antenna chips is communicatively coupled to antennas of an associated antenna subarray of the plurality of antenna subarrays; determine, based at least in part on a phase shift characteristic associated with the antennas and a quantity of the plurality of antenna subarrays, a set of phase differences between antenna subarrays of the plurality of antenna subarrays; determine, based at least in part on the set of phase differences, a chip position of each antenna chip relative to the associated antenna subarray of the antenna chip; and generate, based at least in part on the chip position of each antenna chip, a layout of an antenna package to receive the antenna array and the plurality of antenna chips.

In some aspects, an apparatus includes: means for receiving, by a device, layout information that identifies a configuration of an antenna array of antennas, wherein the antenna array is to include a plurality of antenna subarrays and a plurality of antenna chips, wherein each antenna chip of the plurality of antenna chips is communicatively coupled to antennas of an associated antenna subarray of the plurality of antenna subarrays; means for determining, by the device and based at least in part on a phase shift characteristic associated with the antennas and a quantity of the plurality of antenna subarrays, a set of phase differences between antenna subarrays of the plurality of antenna subarrays; means for determining, by the device and based at least in part on the set of phase differences, a chip position of each antenna chip relative to the associated antenna subarray of the antenna chip; and means for generating, by the device and based at least in part on the chip position of each antenna chip, a layout of an antenna package to receive the antenna array and the plurality of antenna chips.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A radar sensor device may include an antenna array. The antenna array may include a plurality of antenna subarrays. The side-lobe level (SLL) associated with the antenna subarrays may be an important key performance indicator for the radar sensor device. SSLs can be caused by the shape and size of the antenna array, analog tapering, digital windows, and system impairments. In analog beamforming based arrays, one of the most dominant factors compromising the SLL is the quantization error caused by analog phase shifter, a physical configuration of the antenna subarrays, antenna chips (transceivers) associated with the antenna subarrays, a length of a trace connecting an antenna included in the antenna subarray to the antenna chip, and/or the like. High SSLs can cause the radar sensor device to mistakenly detect false targets, mask real targets, and/or the like.

Some aspects described herein may relate to an array configuration module that is configured to reduce SSLs of an antenna array by varying a distance of each antenna chip with respect to an antenna subarray associated with the antenna chip. In some aspects, the array configuration module may vary the distance of each antenna chip based on a wavelength of a signal transmitted or received by the antenna subarray. In some aspects, the array configuration module may vary the distance of each antenna chip based on a phase shift associated with each antenna subarray. By varying the distance of each antenna chip with respect to the antenna subarray associated with the antenna chip, the array configuration module may reduce the SSLs associated with the antenna array.

Figure 1:
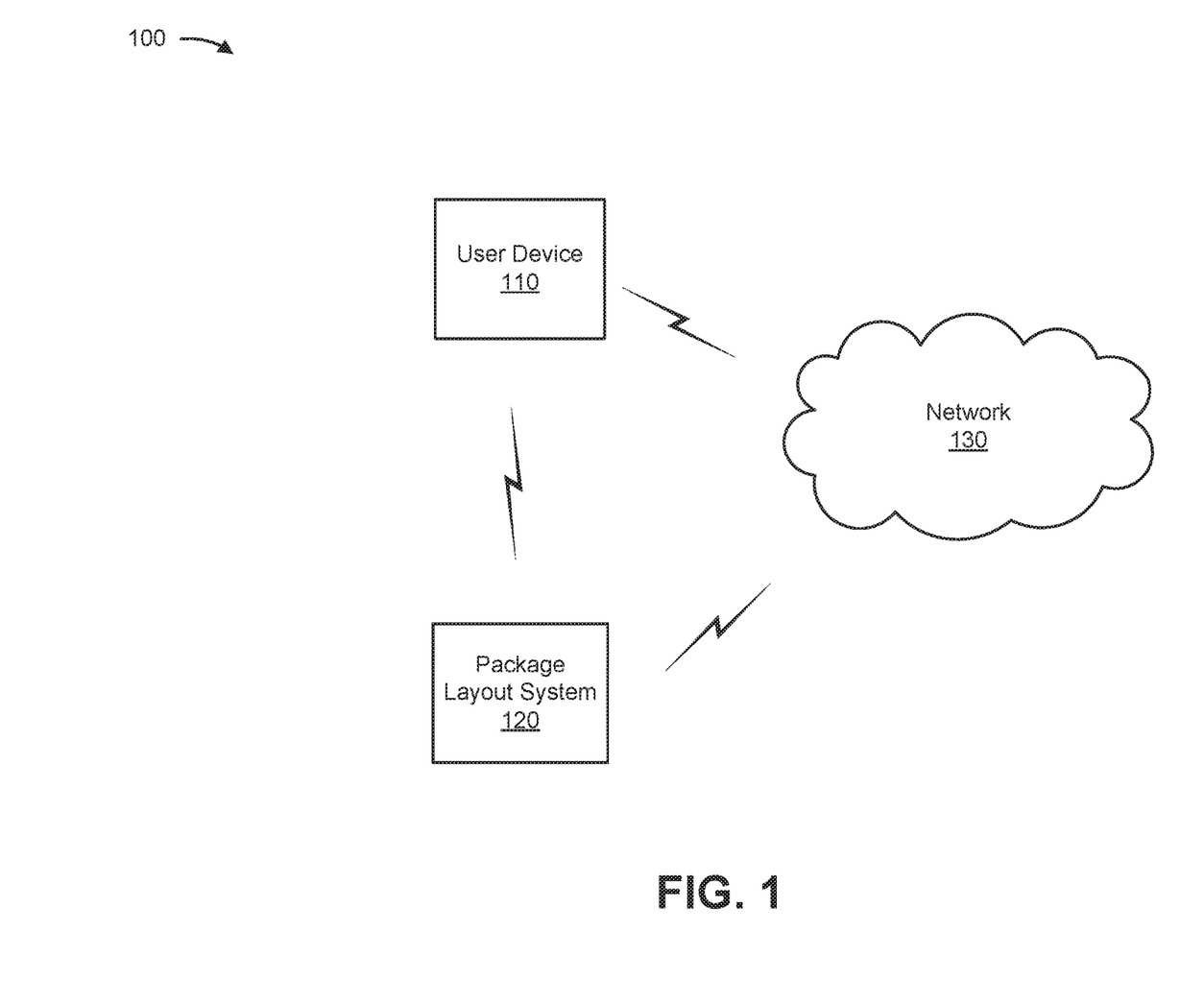
FIG. 1 is a diagram illustrating an example environment in which systems and methods for determining a chip configuration for an antenna array described herein may be implemented, in accordance with various aspects of the present disclosure.

FIG. 1 is a diagram of an example environment 100 in which systems and/or methods described herein may be implemented. As shown in FIG. 1, environment 100 may include a user device 110, a package layout system 120, and a network 130. Devices of environment 100 may interconnect via wired connections, wireless connections, or a combination of wired and wireless connections.

User device 110 includes one or more devices capable of receiving, generating, storing, processing, and/or providing information associated with determining a layout of an antenna package for an antenna array, as described elsewhere herein. User device 110 may include a communication device and/or a computing device. For example, user device 110 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 110 may communicate with one or more other devices of environment 100, as described elsewhere herein.

Package layout system 120 includes one or more devices capable of receiving, generating, storing, processing, and/or providing information associated with assembling components of the antenna array based at least in part on the layout of the antenna package for the antenna array, as described elsewhere herein. For example, package layout system 120 may include one or more devices and/or machines associated with assembling an antenna array where a distance between each antenna chip and an antenna subarray, of the antenna array, is varied.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
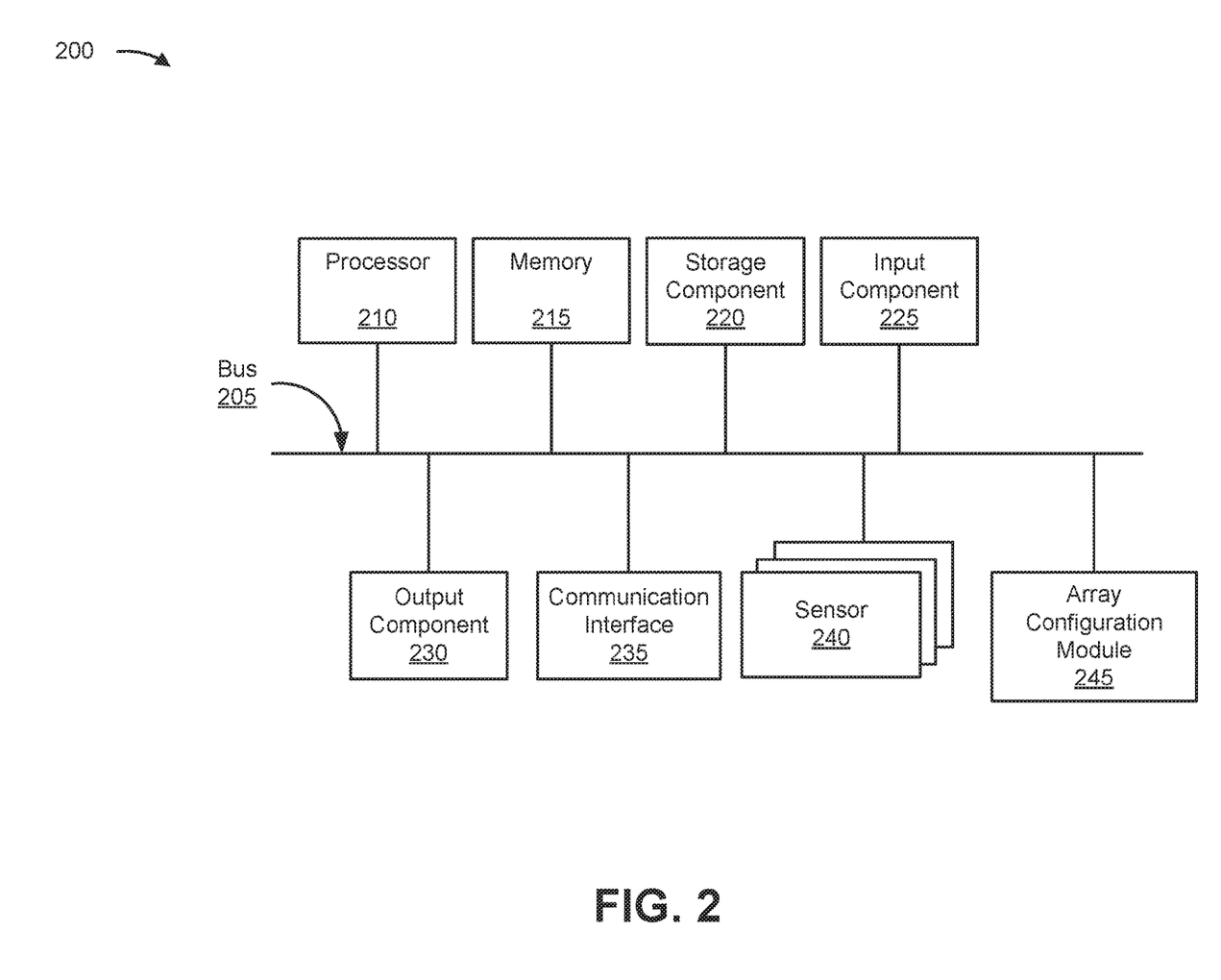
FIG. 2 is a diagram illustrating example components of one or more devices shown in FIG. 1, such as a package layout system and a user device, in accordance with various aspects of the present disclosure.

FIG. 2 is a diagram illustrating example components of a device 200, in accordance with various aspects of the present disclosure. Device 200 may correspond to user device 110 and/or package layout system 120. In some aspects, user device 110 and/or package layout system 120 may include one or more devices 200 and/or one or more components of device 200. As shown in FIG. 2, device 200 may include a bus 205, a processor 210, a memory 215, a storage component 220, an input component 225, an output component 230, a communication interface 235, a sensor 240, an array configuration module 245, and/or the like.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component, a global navigation satellite system (GNSS) component, and/or the like) a sensor for sensing information (e.g., an accelerometer, a gyroscope, an actuator, another type of position or environment sensor, and/or the like)). Output component 230 includes a component that provides output information from device 200 (e.g., a display, a speaker, a haptic feedback component, an audio or visual indicator, and/or the like).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), a cellular network interface, and/or the like.

Sensor 240 includes one or more devices capable of sensing characteristics associated with device 200 (e.g., a characteristic of a physical environment or operating condition of device 200). Sensor 240 may include one or more integrated circuits (e.g., one a packed silicon die) and/or one or more passive components of one or more flex circuits to enable communication with one or more components of device 200.

Alternatively, and/or additionally, sensor 240 may include a magnetometer (e.g., a Hall effect sensor, an anisotropic magneto-resistive (AMR) sensor, a giant magneto-resistive sensor (GMR), and/or the like), a location sensor (e.g., a global positioning system (GPS) receiver, a local positioning system (LPS) device (e.g., that uses triangulation, multilateration, etc.), and/or the like), a gyroscope (e.g., a microelectro-mechanical systems (MEMS) gyroscope or a similar type of device), an accelerometer, a speed sensor, a motion sensor, an infrared sensor, a temperature sensor, a pressure sensor, and/or the like.

Array configuration module 245 includes one or more devices capable of receiving, generating, storing, processing, and/or providing information associated with determining a chip configuration for an antenna array. For example, array configuration module 245 may include a communication and/or computing device, such as a desktop computer, a laptop computer, a tablet computer, a wireless communication device, a server, or a similar type of device. In some aspects, array configuration module 245 may receive input associated with an antenna array of antennas (e.g., information that identifies a configuration of an antenna array of antennas), and may provide output identifying an antenna package layout for the antenna array based on the input.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for receiving layout information that identifies a configuration of an antenna array of antennas, wherein the antenna array is to include a plurality of antenna subarrays and a plurality of antenna chips, and wherein each antenna chip of the plurality of antenna chips is communicatively coupled to antennas of an associated antenna subarray of the plurality of antenna subarrays; means for determining, based at least in part on a phase shift characteristic associated with the antennas and a quantity of the plurality of antenna subarrays, a set of phase differences between antenna subarrays of the plurality of antenna subarrays; means for determining, based at least in part on the set of phase differences, a chip position of each antenna chip relative to the associated antenna subarray of the antenna chip; means for generating, based at least in part on the chip position of each antenna chip, a layout of an antenna package to receive the antenna array and the plurality of antenna chips, and/or the like. In some aspects, such means may include one or more components of device 200 described in connection with FIG. 2, such as bus 205, processor 210, memory 215, storage component 220, input component 225, output component 230, communication interface 235, sensor 240, array configuration module 245, and/or the like.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
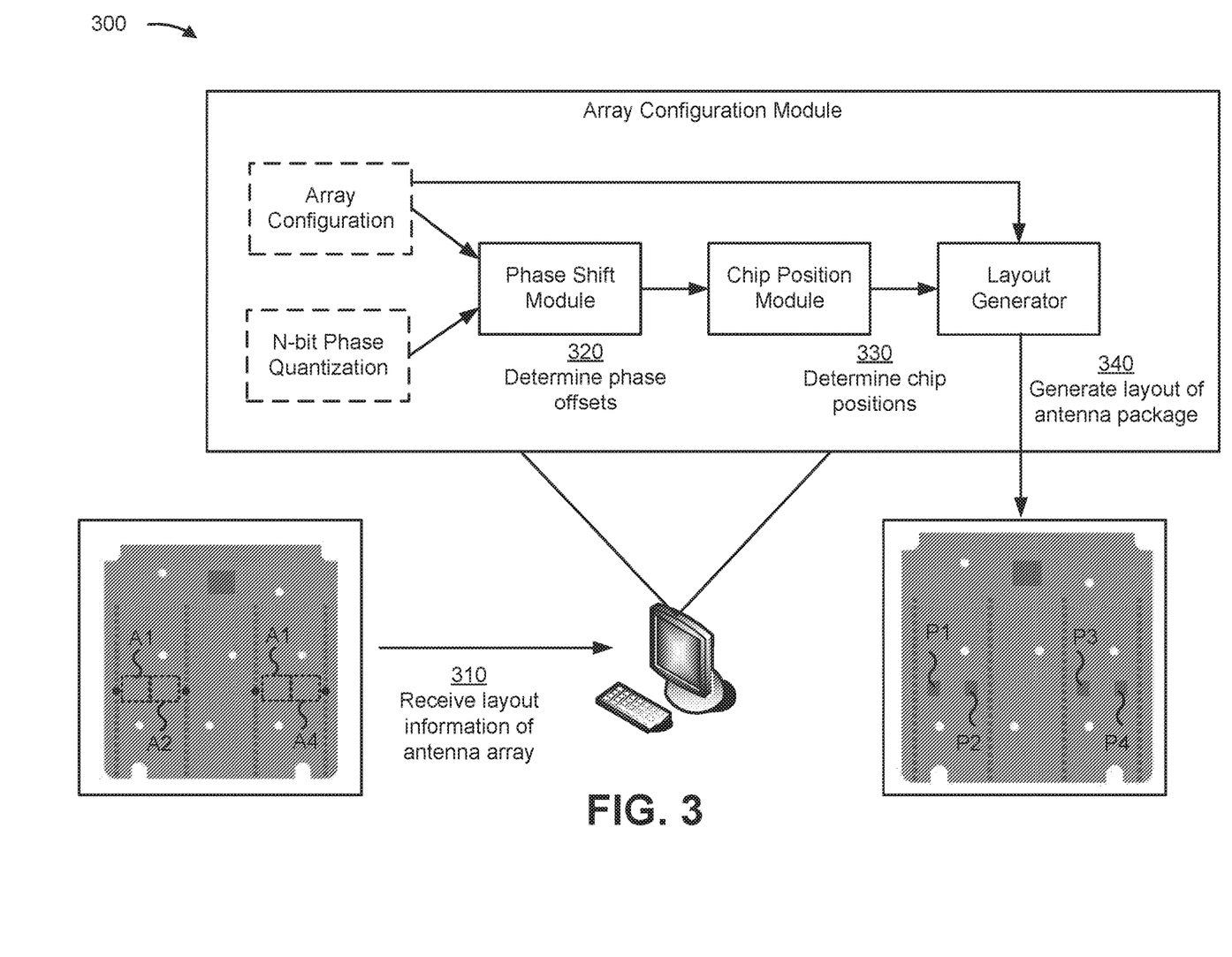
FIGS. 3 and 4A-4C are diagrams illustrating examples associated with determining a chip configuration for an antenna array, in accordance with various aspects of the present disclosure.

FIG. 3 is a diagram illustrating an example 300 associated with determining a chip configuration for an antenna array, in accordance with various aspects of the present disclosure. As shown in FIG. 3, example 300 includes a computing device (e.g., user device 110) that includes an array configuration module for configuring an antenna array included in a radar device. The array configuration module may configure the antenna array to reduce side-lobe levels (SLLs) associated with one or more signals that are transmitted and/or received by the antenna array.

As described herein, the antenna array may be configured to transmit one or more types of signals (e.g., signals for radar, telecommunication, and/or the like). For example, the one or more signals may be within a certain set of frequency ranges (e.g., 21-26 gigahertz (GHz) (e.g., for ultrawideband (UWB)), 76-81 GHz (e.g., for radar), 57-67 GHz (e.g., for Wifi and/or consumer electronics radar), and/or the like). Accordingly, as described herein, the antenna array and/or the array configuration module may be configured to reduce the SLLs based on the certain frequency ranges of the signals that are to be transmitted and/or received by antennas of the antenna array.

As shown in FIG. 3, and by reference number 310, the array configuration module receives layout information of the antenna array. The layout information may be input by a user via a user interface associated with the array configuration module. Alternatively, and/or additionally, the layout information may be received from another device. For example, the array configuration module may obtain the layout information from a data structure (e.g., a data base, a table, and/or the like) storing information associated with a configuration of an antenna array. The array configuration module may obtain the layout information from the data structure.

In some aspects, the antenna array may include a receive antenna array, a transmit antenna array that includes a plurality of antenna subarrays, a set of antenna chips, and/or the like. The receive antenna array may include a quantity of receive antennas (e.g., 24, 32, and/or the like). The receive antennas may be positioned in a pattern (e.g., a row, a column, and/or the like) on a printed circuit board (PCB).

A configuration of each antenna subarray, of the plurality of antenna subarrays may be the same. For example, an antenna subarray, of the plurality of antenna subarrays, may include a quantity of transmit antennas (e.g., 24, 32, and/or the like). The transmit antennas may be positioned in a column on the PCB. The antenna subarray may be associated with an antenna chip, of the set of antenna chips. Each transmit antenna, of the antenna subarray may be connected to the antenna chip via a respective trace included on the PCB.

The layout information may include information indicating a configuration of the antenna array. For example, the layout information may include information indicating a quantity of receive antennas included in a receive antenna array, a quantity of antenna subarrays, a quantity of transmit antennas included in an antenna subarray, information identifying a phase shift characteristic associated with the antenna array, one or more physical dimensions of the antenna array, and/or the like.

In some aspects, the layout information may include information identifying one or more chip areas in which the antenna chips are to be located (e.g., areas A1-A4, as shown in FIG. 3). The chip areas may be identified based on a reference point associated with each antenna subarray. For example, the chip areas may be identified based on a distance, a range of distances, and/or the like that a center of the chip area is from a particular transmit antenna included in the antenna subarray (e.g., a center transmit antenna, a first transmit antenna, a last transmit antenna, and/or the like).

As shown by reference number 320, the array configuration module determines phase offsets associated with the antenna array. The array configuration module may determine the phase offsets associated with the antenna array based on a quantity of antenna subarrays and a quantity of phase offsets associated with the phase quantization. The array configuration module may determine the phase offset for a antenna subarray (i) based on the equation:

$$\text{Phase offset} = 360/2^B/N^*(i-1), \text{ when } i-1 \text{ to } N \quad (1)$$

where N is the quantity of antenna subarrays and B is the quantity of phase offsets associated with the phase quantization. As an example, assume the quantity of antenna subarrays to be 4 and the quantity of phase offsets associated with the phase quantization to be 8 (e.g., a 3-bit phase shifter). The array configuration module may determine the phase offsets to be 0 for a first antenna subarray (e.g., i-1), 11.25 degrees for a second antenna subarray, 22.5 degrees for a third antenna subarray, and 33.75 degrees for a fourth antenna subarray.

As shown by reference number 330, the array configuration module determines chip positions for the antenna chips. The array configuration module may determine the chip positions for each antenna chip to cause a respective distance between the antenna chip and the respective antenna subarray with which the antenna chips are associated to be different.

As an example, assume the antenna array includes four antenna subarrays and four antenna chips. The array configuration module may determine a chip position of a first antenna chip to be a first distance from a first antenna subarray with which the first antenna chip is associated. The array configuration module may determine a chip position of a second antenna chip to be a second distance from a second antenna subarray with which the second antenna chip is associated. The array configuration module may determine a chip position of a third antenna chip to be a third distance from a third antenna subarray with which the third antenna chip is associated. The array configuration module may determine a chip position of a fourth antenna chip to be a fourth distance from a fourth antenna subarray with which the fourth antenna chip is associated. The first distance may be different from the second distance, the third distance, and the fourth distance. The second distance may be different from the third distance and the fourth distance. The third distance may be different from the fourth distance. For example, the first distance may be 1.0 mm, the second distance may be 0.9 mm, the third distance may be 1.1 mm, and the fourth distance may be 1.2 mm.

In some aspects, the array configuration module determines the chip position for an antenna chip relative to a reference point associated with an antenna subarray with which the antenna chip is associated. The reference point may be aligned along a reference axis with reference points of other antenna subarrays of the plurality of antenna subarrays. The reference axis may be perpendicular to a column formed by the transmit antennas included in the antenna subarray.

In some aspects, the chip position is determined based on a wavelength of signals that are to be transmitted (or received) by the antenna subarray and physical dimensions of the antenna array. For example, the array configuration module may determine the chip position such that a distance between the antenna chip and the antenna subarray is equal to one-half the wavelength of a signal that is to be transmitted by the transmit antenna.

In some aspects, the chip position is determined based on the phase offsets determined for the antenna array. The array configuration module may determine the chip positions such that the differences between the distances are configured to generate phase differences between a pair of antenna subarrays corresponding to the phase offsets determined for the antenna subarrays.

As shown by reference number 340, the array configuration module generates a layout of the antenna package. The array configuration module may generate the layout of the antenna package based on the distances determined for the chip antennas.

In some implementations, the array configuration module determines trace routes for traces of the antennas. The array configuration module may generate the layout to include the trace routes to permit the traces to communicatively couple the antennas to the plurality of antenna chips.

As indicated above, FIG. 3 is provided as an example. Other examples may differ from what is described with respect to FIG. 3.

Figure 4A:
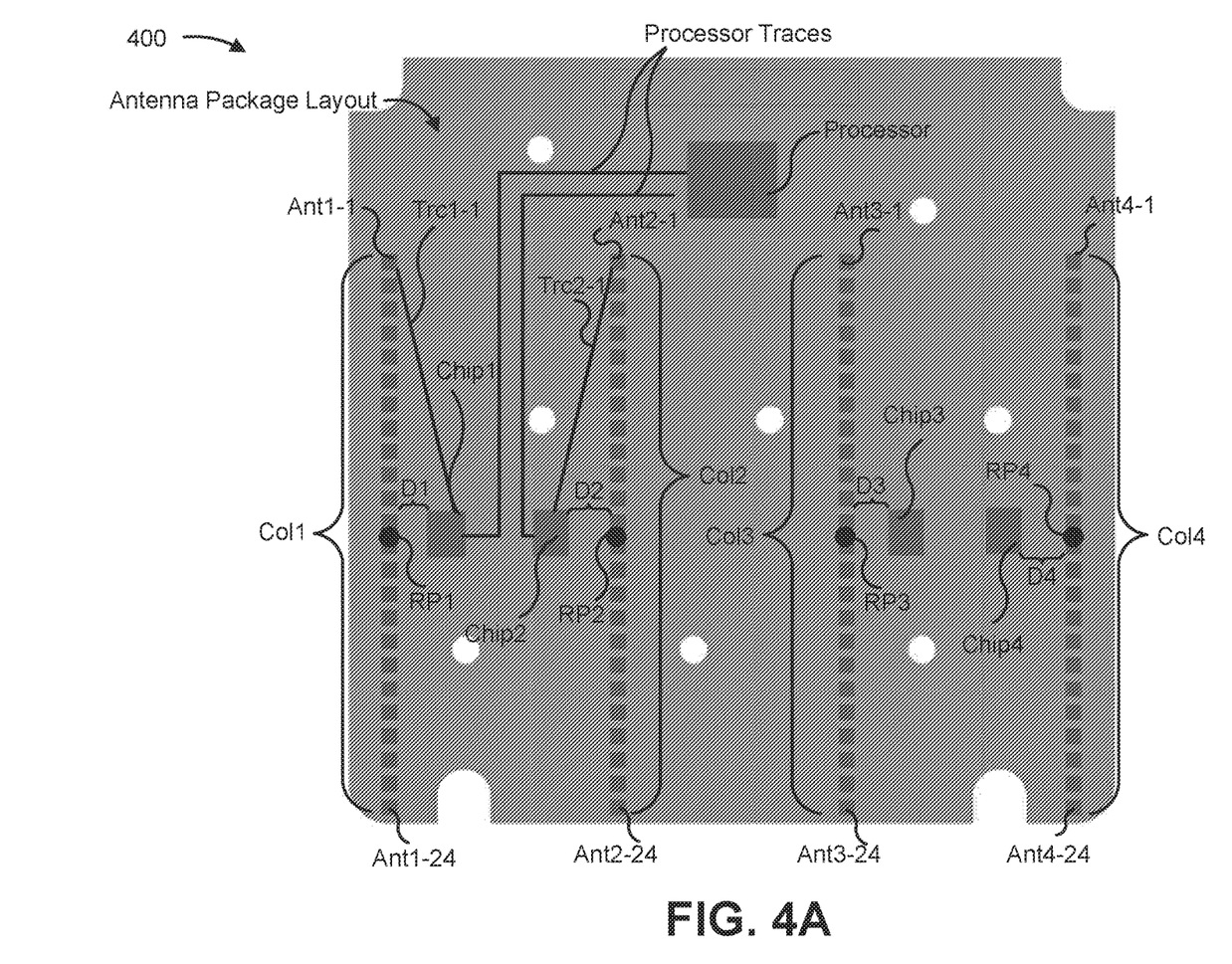
Figure 4B:
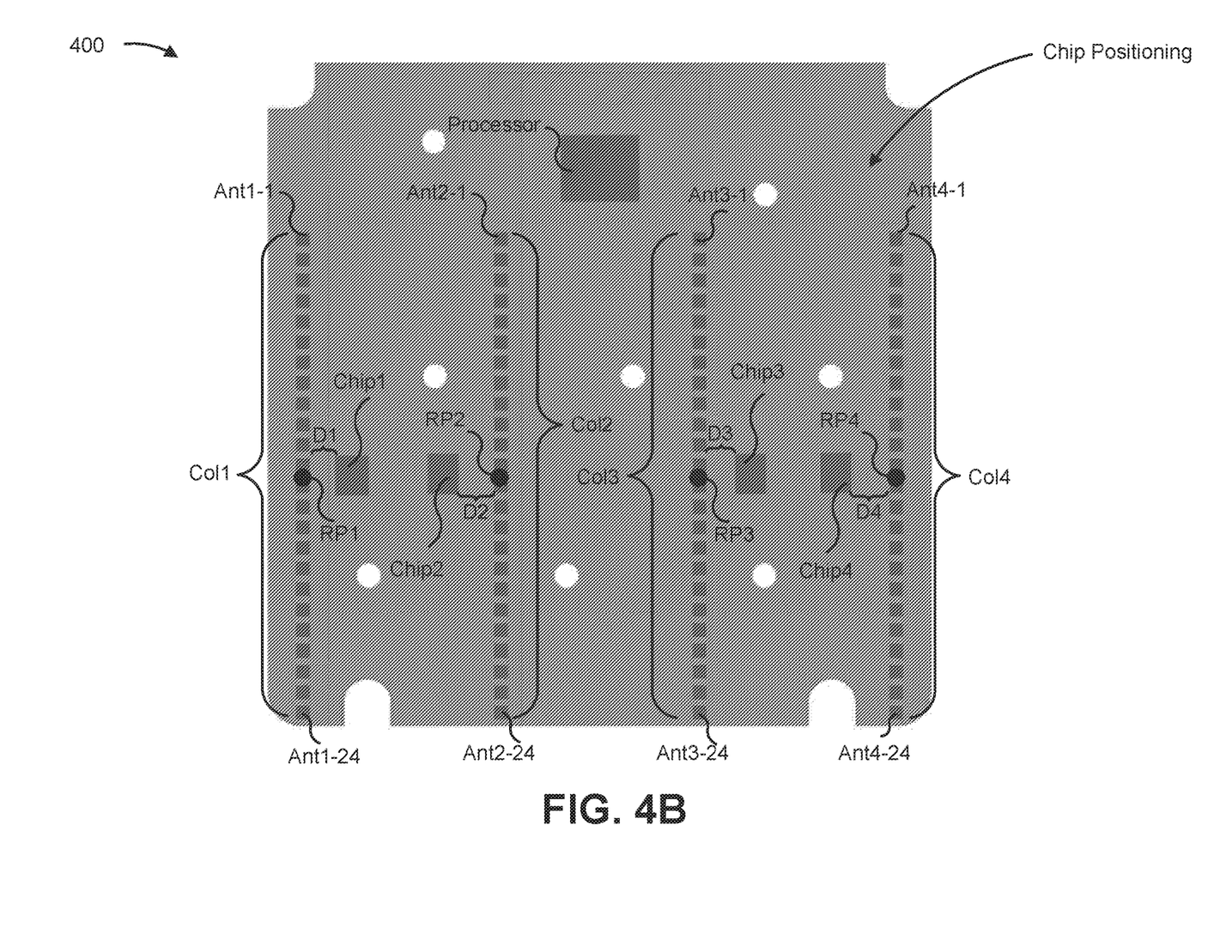
Figure 4C:
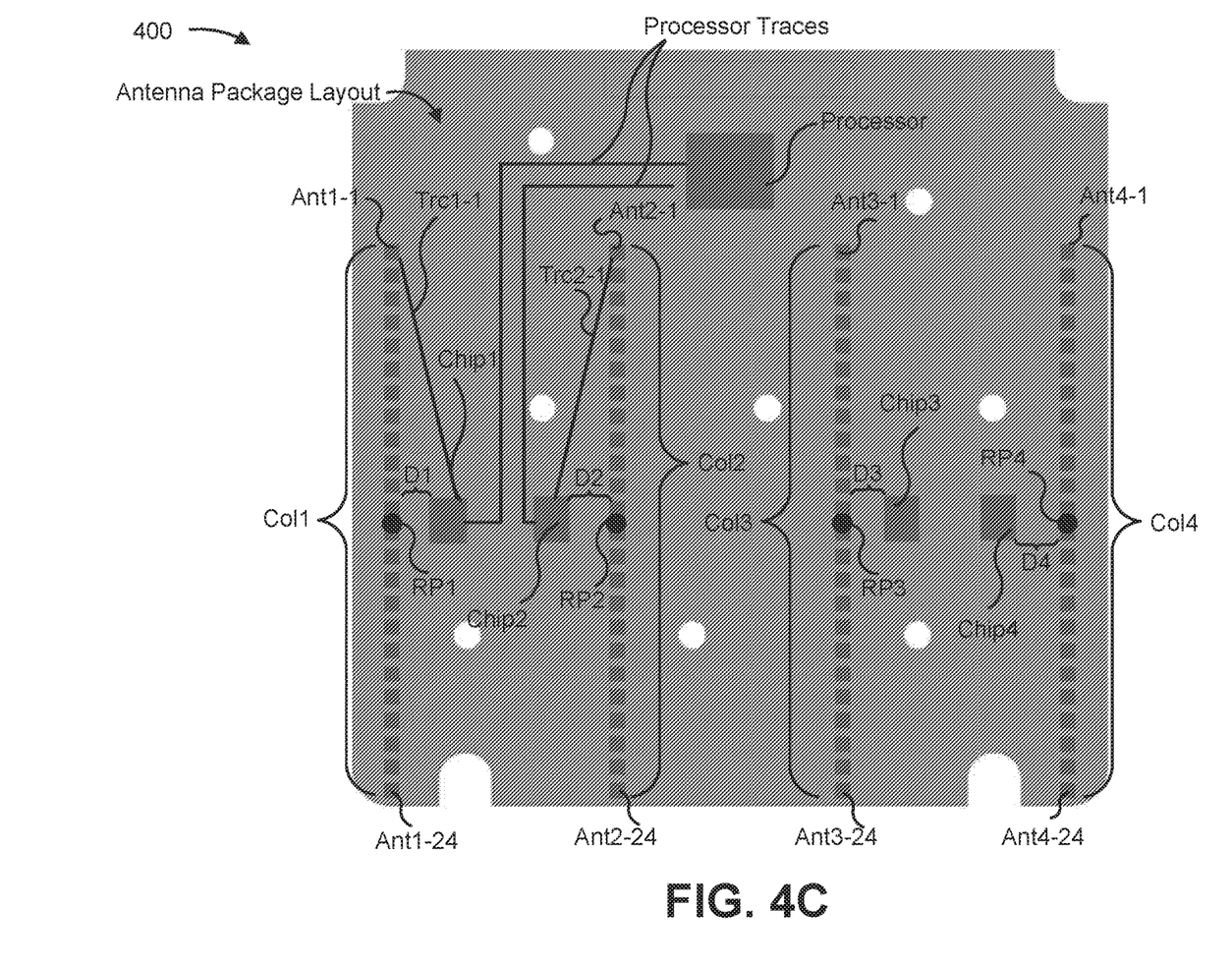

FIG. 4A-4C are diagrams illustrating an example 400 associated with a chip configuration for an antenna array, in accordance with various aspects of the present disclosure. As shown in FIGS. 4A-4C, example 400 includes a configuration of an antenna array for an antenna package, example positioning of antenna chips for columns of the antenna array, and generation of a layout of the antenna package.

As shown in FIG. 4A of example 400, an example antenna array includes four subarrays of antennas (shown as and referred to individually as "Col1," "Col2," "Col3," and "Col4" and collectively as "the columns"). More specifically, Col1 includes antennas Ant1-1 to Ant1-24, Col2 includes Ant2-1 to Ant2-24, Col3 includes Ant3-1 to Ant3-24, and Col4 includes Ant4-1 to Ant4-24. Furthermore, in FIG. 4A, each of the columns include respective reference points (shown as and referred to individually as "RP1," "RP2," "RP3," and "RP4" and collectively as "the reference points"). As described herein, the reference points may be used for positioning antenna chips (e.g., analog connectors that are to communicatively couple the antennas to the processor or transceiver) at different distances relative to the antenna columns.

In example 400, the reference points are at relatively the same location of each respective column based on the configuration of the antennas of the columns. As shown, RP1 is located midway between ends of Col1 (corresponding to positions of Ant1-1 and Ant1-24), RP2 is located midway between ends of Col2 (corresponding to positions of Ant2-1 and Ant2-24), RP3 is located midway between ends of Col3 (corresponding to positions of Ant3-1 and Ant3-24), and RP4 is located midway between ends of Col4 (corresponding to positions of Ant4-1 and Ant4-24). The reference points may be preconfigured locations of the columns (e.g., based on designated areas for positioning the antenna chips). In other examples, reference points may be located at different locations of the columns relative to the configuration of the columns, at different locations according to a design layout of the antenna package (e.g., to account for mounting holes or structures, via in a PCB of the package, and/or the like), and/or the like.

As shown in FIG. 4B, antenna chips (Chip1 to Chip4) are positioned at various distances (referred to herein individually as "D1," "D2," "D3," and "D4" and collectively as "the distances") relative to RP1, RP2, RP3, and RP4, such that D1≠D2≠D3≠D4. For example, differences between the distances (e.g., between each set of pairs of the distances) may be greater than a particular threshold distance (e.g., a threshold distance that is based on the half-wavelength of signals that are to be transmitted and/or received by the antennas). The threshold distance may be a certain order of magnitude (e.g., ten times, fifty times, one hundred times, and/or the like) greater than a threshold manufacturing tolerance for manufacturing a PCB to include conductive pads for the antenna chips and/or a threshold assembly tolerance for positioning the antenna chips on designated pads of the PCB, and/or the like. As described herein, the differences between the distances may be configured based at least on in part on a phase shift characteristic of the antennas and/or the fact that the antenna array of example 400 includes four subarrays (the columns). For example, as described herein, the differences between the distances may be configured to generate phase differences between a set (e.g., a pair) of columns (e.g., any combination of Col1, Col2, Col3, and Col4) (and/or a set of corresponding antennas of the set of columns) in order to reduce a quantization error associated with the set of columns.

As shown in FIG. 4C, a layout of the antenna package is generated according to the positions of the antenna chips at the various differences from the reference points of the columns. In FIG. 4C, the processor is communicatively coupled to Chip1 and Chip 2 via separate processor traces. The layout of example 400 is shown to include a trace from Ant1-1 to Chip1 (shown as and referred to herein as "Trc1-1") and a trace from Ant2-1 to Chip2 (shown as and referred to herein as "Trc2-1"). Ultimately, the layout may include similar traces for the remaining antennas of the antenna array of example 400. As described herein, Ant1-1 and Ant2-1 are considered to be in a same position relative to configurations of Col1 and Col2, respectively. Further, as mentioned above, D1 is different from D2, and correspondingly, the length of Trc1-1 is different than Trc2-1, thereby causing the processor to interpret a phase difference between received signals of Ant1-1 and Ant1-2 (due to the difference in the physical configuration/length of trace routes between the processor and Ant1-1 and the processor and Ant2-1). Accordingly, a quantization error caused by the set of phase differences that configured between Ant1-1 and Ant2-1 based on the differences of D1 and D2 may be different, thereby reducing the quantization error relative to a scenario in which D1 and D2 are the same and the phase differences are not set or preconfigured for Col1 and Col2 (and/or Chip1 and Chip2). In this way, the various distances between the antenna chips and corresponding reference points of the columns can reduce the quantization error between sets of subarrays of an antenna array, thereby reducing a side-lobe interference of the antenna array and, correspondingly, improving the accuracy of the antenna array.

Alternatively, and/or additionally, antenna chips (Chip1 to Chip4) may be positioned at a same distance relative to RP1, RP2, RP3, and RP4, such that D1=D2=D3=D4. In this case, a length of the traces between the antennas and antenna chips may be changed. For example, Trc1-1 may be changed to be different than Trc2-1, thereby causing the processor to interpret a phase difference between received signals of Ant1-1 and Ant1-2 (due to the difference in the physical configuration/length of trace routes between the processor and Ant1-1 and the processor and Ant2-1). Accordingly, a quantization error caused by the set of phase differences that configured between Ant1-1 and Ant2-1 based on the differences of Trc1-1 and Trc2-1 may be different, thereby reducing the quantization error relative to a scenario in which Trc1-1 and Trc2-1 are the same and the phase differences are not set or preconfigured for Col1 and Col2 (and/or Chip1 and Chip2). In this way, the various lengths of the traces can reduce the quantization error between sets of subarrays of an antenna array, thereby reducing a side-lobe interference of the antenna array and, correspondingly, improving the accuracy of the antenna array.

As indicated above, FIG. 4A-4C is provided as an example. Other examples may differ from what is described with respect to FIG. 4A-4C.

Figure 5:
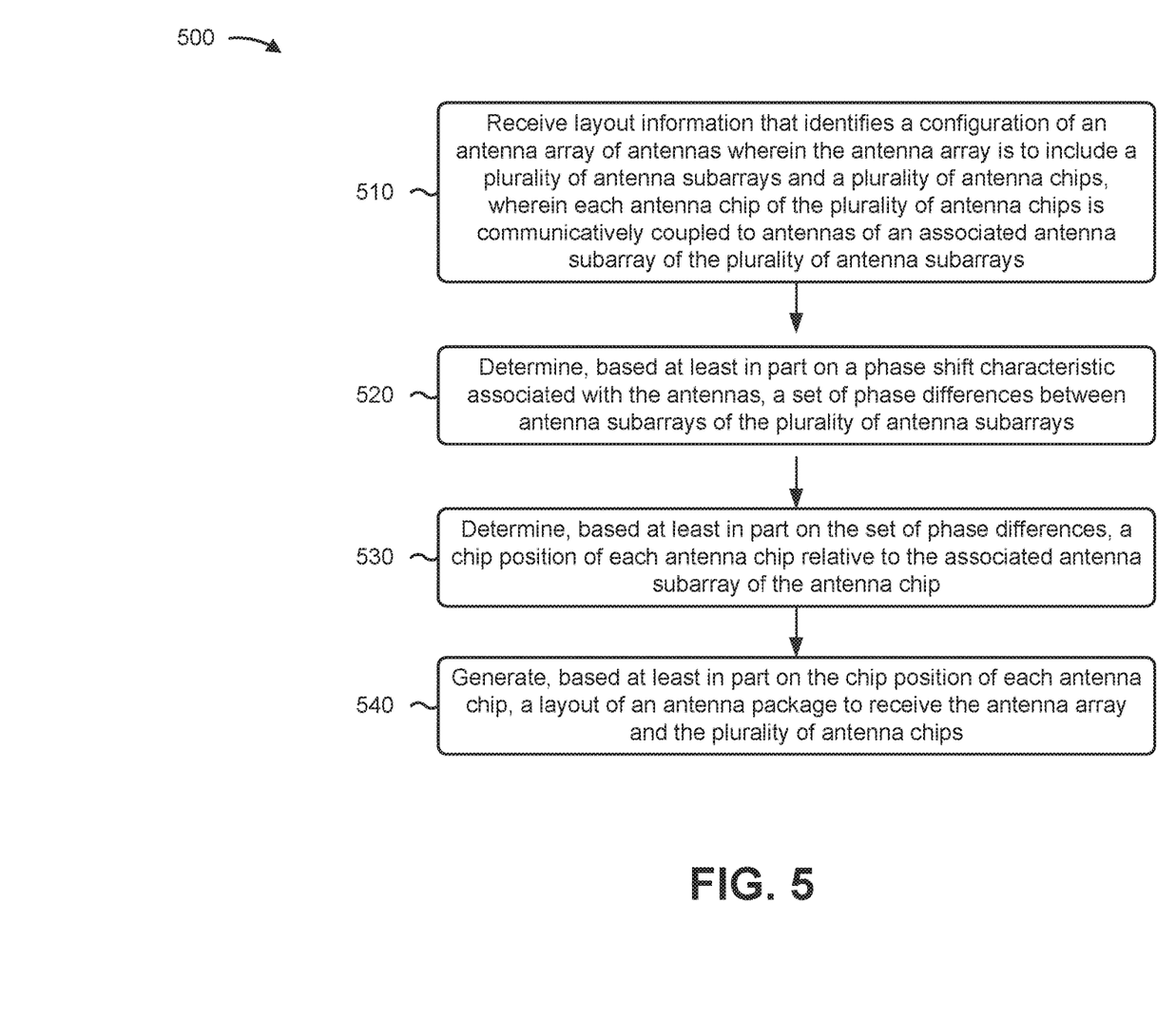
FIG. 5 is a flow chart of example processes associated with determining a chip configuration for an antenna array, in accordance with various aspects of the present disclosure.

FIG. 5 is a diagram illustrating an example process 500 performed, for example, by a device, in accordance with various aspects of the present disclosure. Example process 500 is an example where the device (e.g., user device 110, package layout system 120, and/or the like) performs operations associated with determining a chip configuration for an antenna array.

As shown in FIG. 5, in some aspects, process 500 may include receiving layout information that identifies a configuration of an antenna array of antennas, wherein the antenna array is to include a plurality of antenna subarrays and a plurality of antenna chips, wherein each antenna chip of the plurality of antenna chips is communicatively coupled to antennas of an associated antenna subarray of the plurality of antenna subarrays (block 510). For example, the device (e.g., using processor 210, memory 215, storage component 220, input component 225, output component 230, communication interface 235, sensor 240, array configuration module 245, and/or the like) may receive layout information that identifies a configuration of an antenna array of antennas, as described above. In some aspects, the antenna array is to include a plurality of antenna sub arrays and a plurality of antenna chips. In some aspects, each antenna chip of the plurality of antenna chips is communicatively coupled to antennas of an associated antenna subarray of the plurality of antenna subarrays.

As further shown in FIG. 5, in some aspects, process 500 may include determining, based at least in part on a phase shift characteristic associated with the antennas, a set of phase differences between antenna subarrays of the plurality of antenna subarrays (block 520). For example, the device (e.g., using processor 210, memory 215, storage component 220, input component 225, output component 230, communication interface 235, sensor 240, array configuration module 245, and/or the like) may determine, based at least in part on a phase shift characteristic associated with the antennas, a set of phase differences between antenna subarrays of the plurality of antenna subarrays, as described above.

As further shown in FIG. 5, in some aspects, process 500 may include determining, based at least in part on the set of phase differences, a chip position of each antenna chip relative to the associated antenna subarray of the antenna chip (block 530). For example, the device (e.g., using processor 210, memory 215, storage component 220, input component 225, output component 230, communication interface 235, sensor 240, array configuration module 245, and/or the like) may determine, based at least in part on the set of phase differences, a chip position of each antenna chip relative to the associated antenna subarray of the antenna chip, as described above.

As further shown in FIG. 5, in some aspects, process 500 may include generating, based at least in part on the chip position of each antenna chip, a layout of an antenna package to receive the antenna array and the plurality of antenna chips (block 540). For example, the device (e.g., using processor 210, memory 215, storage component 220, input component 225, output component 230, communication interface 235, sensor 240, array configuration module 245, and/or the like) may generate, based at least in part on the chip position of each antenna chip, a layout of an antenna package to receive the antenna array and the plurality of antenna chips, as described above.

Process 500 may include additional aspects, such as any single aspect or any combination of aspects described below and/or in connection with one or more other processes described elsewhere herein.

In a first aspect, the layout information identifies the configuration by indicating at least one of: a quantity of the plurality of antenna subarrays, a quantity of antenna rows of the antenna array, one or more physical dimensions of the antenna array, or the phase shift characteristic.

In a second aspect, alone or in combination with the first aspect, the phase shift characteristic comprises an N-bit phase shifter quantization.

In a third aspect, alone or in combination with one or more of the first and second aspects, determining the chip position of each antenna chip comprises: determining the chip position relative to a reference point of the associated antenna subarray, the reference point of the associated antenna subarray is aligned along a reference axis with other reference points of antenna subarrays of the plurality of antenna subarrays, the reference axis is perpendicular to the antenna subarrays.

In a fourth aspect, alone or in combination with one or more of the first through third aspects, the chip position of each antenna chip is configured so that differences between distances, between each of the plurality of antenna chips and corresponding antennas of the plurality of antenna subarrays, are greater than a threshold. Alternatively, and/or additionally, trace lengths of each antenna chip is configured so that differences between trace lengths, between each of the plurality of antenna chips and corresponding antennas of the plurality of antenna subarrays, are greater than a threshold.

In a fifth aspect, alone or in combination with one or more of the first through fourth aspects, the antenna array is configured to enable beam forming of a transmitted or received radio detection and ranging (RADAR) signal.

In a sixth aspect, alone or in combination with one or more of the first through fifth aspects, the chip position of each antenna chip is configured to cause the antenna package to reduce side-lobe levels associated with a beam of the RADAR signal. Alternatively, and/or additionally, a trace length between each antenna chip and corresponding antennas of the plurality of antenna subarrays is configured to cause the antenna package to reduce side-lobe levels associated with a beam of the RADAR signal.

In a seventh aspect, alone or in combination with one or more of the first through sixth aspects, the chip position is determined based at least in part on a wavelength of signals that are to be transmitted by the antenna array and physical dimensions of the antenna array.

In an eighth aspect, alone or in combination with one or more of the first through seventh aspects, generating the layout comprises: determining trace routes for traces of the antennas, and generating the layout to include the trace routes to permit the traces to communicatively couple the antennas to the plurality of antenna chips.

In a ninth aspect, alone or in combination with one or more of the first through eighth aspects, process 500 includes at least one of: presenting, via a display, the layout to permit the layout to be edited; or providing the layout of the antenna package to a machine to cause the machine to generate the antenna package.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device, layout information that identifies a configuration of an antenna array of antennas,
      wherein the antenna array is to include a plurality of antenna subarrays and a plurality of antenna chips,
         wherein each antenna chip of the plurality of antenna chips is communicatively coupled to antennas of an associated antenna subarray of the plurality of antenna subarrays;
   determining, by the device and based at least in part on a phase shift characteristic associated with the antennas, a set of phase differences between antenna subarrays of the plurality of antenna subarrays;
   determining, by the device and based at least in part on the set of phase differences, a chip position of each antenna chip relative to the associated antenna subarray of the antenna chip; and
   generating, by the device and based at least in part on the chip position of each antenna chip, a layout of an antenna package to receive the antenna array and the plurality of antenna chips.

2. The method of claim 1, wherein the layout information identifies the configuration by indicating at least one of:
   a quantity of the plurality of antenna subarrays,
   a quantity of antenna rows of the antenna array,
   one or more physical dimensions of the antenna array, or
   the phase shift characteristic.

3. The method of claim 1, wherein the phase shift characteristic comprises an N-bit phase shifter quantization.

4. The method of claim 1, wherein determining the chip position of each antenna chip comprises:
   determining the chip position relative to a reference point of the associated antenna subarray,
      wherein the reference point of the associated antenna subarray is aligned along a reference axis with other reference points of antenna subarrays of the plurality of antenna subarrays,
         wherein the reference axis is perpendicular to the antenna subarrays.

5. The method of claim 1, wherein the chip position of each antenna chip is configured so that differences between distances, between each of the plurality of antenna chips and corresponding antennas of the plurality of antenna subarrays, are greater than a threshold.

6. The method of claim 1, wherein the antenna array is configured to enable beam forming of a transmitted or received radio detection and ranging (RADAR) signal.

7. The method of claim 6, wherein the chip position of each antenna chip is configured to cause the antenna package to reduce side-lobe levels associated with a beam of the RADAR signal.

8. The method of claim 1, wherein the chip position is determined based at least in part on a wavelength of signals that are to be transmitted by the antenna array and physical dimensions of the antenna array.

9. The method of claim 1, wherein generating the layout comprises:
   determining trace routes for traces of the antennas; and
   generating the layout to include the trace routes to permit the traces to communicatively couple the antennas to the plurality of antenna chips.

10. The method of claim 1, further comprising at least one of:
presenting, via a display, the layout to permit the layout to be edited; or
providing the layout of the antenna package to a machine to cause the machine to generate the antenna package.

11. A device, comprising:
a processor;
an antenna array comprising a plurality of antenna subarrays; and
a plurality of antenna chips,
wherein each antenna chip of the plurality of antenna chips is communicatively coupled between the processor and antennas of an associated antenna subarray of the plurality of antenna subarrays, and
wherein differences between distances, between each of the plurality of antenna chips and corresponding antennas of the plurality of antenna subarrays, are based at least in part on a phase shift characteristic and a quantity of the plurality of antenna subarrays.

12. The device of claim 11, wherein the differences of the distances are configured to generate phase differences between a pair of antenna subarrays of the plurality of antenna subarrays in order to reduce a quantization error.

13. The device of claim 11, wherein the phase shift characteristic comprises an N-bit phase shifter quantization.

14. A non-transitory computer-readable medium storing instructions, the instructions comprising:
one or more instructions that, when executed by one or more processors, cause the one or more processors to:
receive layout information that identifies a configuration of an antenna array of antennas,
wherein the antenna array is to include a plurality of antenna subarrays and a plurality of antenna chips,
wherein each antenna chip of the plurality of antenna chips is communicatively coupled to antennas of an associated antenna subarray of the plurality of antenna subarrays;
determine, based at least in part on a phase shift characteristic associated with the antennas and a quantity of the plurality of antenna subarrays, a set of phase differences between antenna subarrays of the plurality of antenna subarrays;
determine, based at least in part on the set of phase differences, a chip position of each antenna chip relative to the associated antenna subarray of the antenna chip; and
generate, based at least in part on the chip position of each antenna chip, a layout of an antenna package to receive the antenna array and the plurality of antenna chips.

15. The non-transitory computer-readable medium of claim 14, wherein the layout information identifies the configuration by indicating at least one of:
a quantity of the plurality of antenna subarrays,
a quantity of antenna rows of the antenna array,
physical dimensions of the antenna array, or
the phase shift characteristic.

16. The non-transitory computer-readable medium of claim 14,
wherein the one or more instructions, that cause the one or more processors to the phase shift characteristic, cause the one or more processors to an N-bit phase shifter quantization.

17. The non-transitory computer-readable medium of claim 14,
wherein the one or more instructions, that cause the one or more processors to determine the chip position of each antenna chip, cause the one or more processors to:
determine the chip position relative to a reference point of the associated antenna subarray,
wherein the reference point of the associated antenna subarray is aligned along a reference axis, with other reference points of antenna subarrays of the plurality of antenna subarrays,
wherein the reference axis is perpendicular to the antenna subarrays.

18. The non-transitory computer-readable medium of claim 14,
wherein the chip position of each antenna chip is configured so that differences between distances, between each of the plurality of antenna chips and corresponding antennas of the plurality of antenna subarrays, are greater than a threshold difference.

19. The non-transitory computer-readable medium of claim 14,
wherein the antenna array is configured to enable beam forming of a transmitted or received radio detection and ranging (RADAR) signal.

20. The non-transitory computer-readable medium of claim 19,
wherein the chip position of each antenna chip is determined so as to cause the antenna package to reduce side-lobe levels associated with a beam of the RADAR signal.

21. The non-transitory computer-readable medium of claim 14,
wherein the antenna array is a transmission antenna array of a radio detection and ranging (RADAR) sensor,
wherein the RADAR sensor is formed using the layout.

22. The non-transitory computer-readable medium of claim 14,
wherein the one or more instructions, that cause the one or more processors to generate the layout, cause the one or more processors to:
determine trace routes for traces of the antennas; and
generate the layout to include the trace routes to permit the traces to communicatively couple the antennas to the plurality of antenna chips.

23. The non-transitory computer-readable medium of claim 14, further comprising at least one of:
present, via a display, the layout to permit the layout to be edited; or
provide the layout of the antenna package to a machine to cause the machine to generate the antenna package.

24. An apparatus, comprising:
means for receiving, by a device, layout information that identifies a configuration of an antenna array of antennas,
wherein the antenna array is to include a plurality of antenna subarrays and a plurality of antenna chips,
wherein each antenna chip of the plurality of antenna chips is communicatively coupled to antennas of an associated antenna subarray of the plurality of antenna subarrays;
means for determining, by the device and based at least in part on a phase shift characteristic associated with the antennas and a quantity of the plurality of antenna subarrays, a set of phase differences between antenna subarrays of the plurality of antenna subarrays;
means for determining, by the device and based at least in part on the set of phase differences, a chip position of each antenna chip relative to the associated antenna subarray of the antenna chip; and means for generating, by the device and based at least in part on the chip position of each antenna chip, a layout of an antenna package to receive the antenna array and the plurality of antenna chips.

25. The apparatus of claim 24,
wherein the layout information identifies the configuration by indicating at least one of:
   a quantity of the plurality of antenna subarrays,
   a quantity of antenna rows of the antenna array,
   physical dimensions of the antenna array, or
   the phase shift characteristic.

26. The apparatus of claim 24,
wherein the phase shift characteristic comprises an N-bit phase shifter quantization.

27. The apparatus of claim 24,
wherein means for determining the chip position of each antenna chip comprises:
   means for determining the chip position relative to a reference point of the associated antenna subarray, wherein the reference point of the associated antenna subarray is aligned along a reference axis, with other reference points of antenna subarrays of the plurality of antenna subarrays,
   wherein the reference axis is perpendicular to the antenna subarrays.

28. The apparatus of claim 24,
wherein the chip position of each antenna chip is configured so that differences between distances, between each of the plurality of antenna chips and corresponding antennas of the plurality of antenna subarrays, are greater than a threshold difference.

29. The apparatus of claim 24,
wherein the antenna array is configured to enable beam forming of a transmitted or received radio detection and ranging (RADAR) signal.

30. The apparatus of claim 29,
wherein the chip position of each antenna chip is determined so as to cause the antenna package to reduce side-lobe levels associated with a beam of the RADAR signal.

* * * * *